United States Patent [19]

Hwang

[11] Patent Number: 4,563,945
[45] Date of Patent: Jan. 14, 1986

[54] HEAT SHIELD-STEAM DISTRIBUTOR FOR COOKING OVEN

[75] Inventor: Yong Y. Hwang, Huron, Ohio

[73] Assignee: Stein Associates, Inc., Sandusky, Ohio

[21] Appl. No.: 670,383

[22] Filed: Nov. 13, 1984

[51] Int. Cl.⁴ ............................................. A47J 27/04
[52] U.S. Cl. .................................. 99/443 C; 99/447; 99/474; 99/477; 426/510
[58] Field of Search ............... 126/348, 369; 426/510, 426/511; 99/386, 443 C, 447, 401, 467, 474, 475, 476, 477

[56] References Cited

U.S. PATENT DOCUMENTS

| | | | |
|---|---|---|---|
| 3,736,860 | 6/1973 | Vischer | 99/477 X |
| 3,815,488 | 6/1974 | Van Dyk | 99/443 C X |
| 3,947,241 | 3/1976 | Caridis | 99/467 |
| 4,121,509 | 10/1978 | Baker | 99/443 C X |

FOREIGN PATENT DOCUMENTS

| | | | |
|---|---|---|---|
| 1075076 | 4/1980 | Canada | 426/510 |
| 0500788 | 1/1976 | U.S.S.R. | 99/386 |

Primary Examiner—Billy J. Wilhite
Attorney, Agent, or Firm—Baldwin, Egan & Fetzer

[57] ABSTRACT

A combined heat shield and steam distributor for a cooking oven, adapted to be located in the oven between a flame producing combustion unit in the oven and a movable food product conveyor, to aid in protecting food product on the conveyor from generally direct exposure to flame, with such shielding and distributor means also providing for distribution of steam into the cooking chamber for intermixing with the gaseous cooking medium of the oven.

8 Claims, 7 Drawing Figures

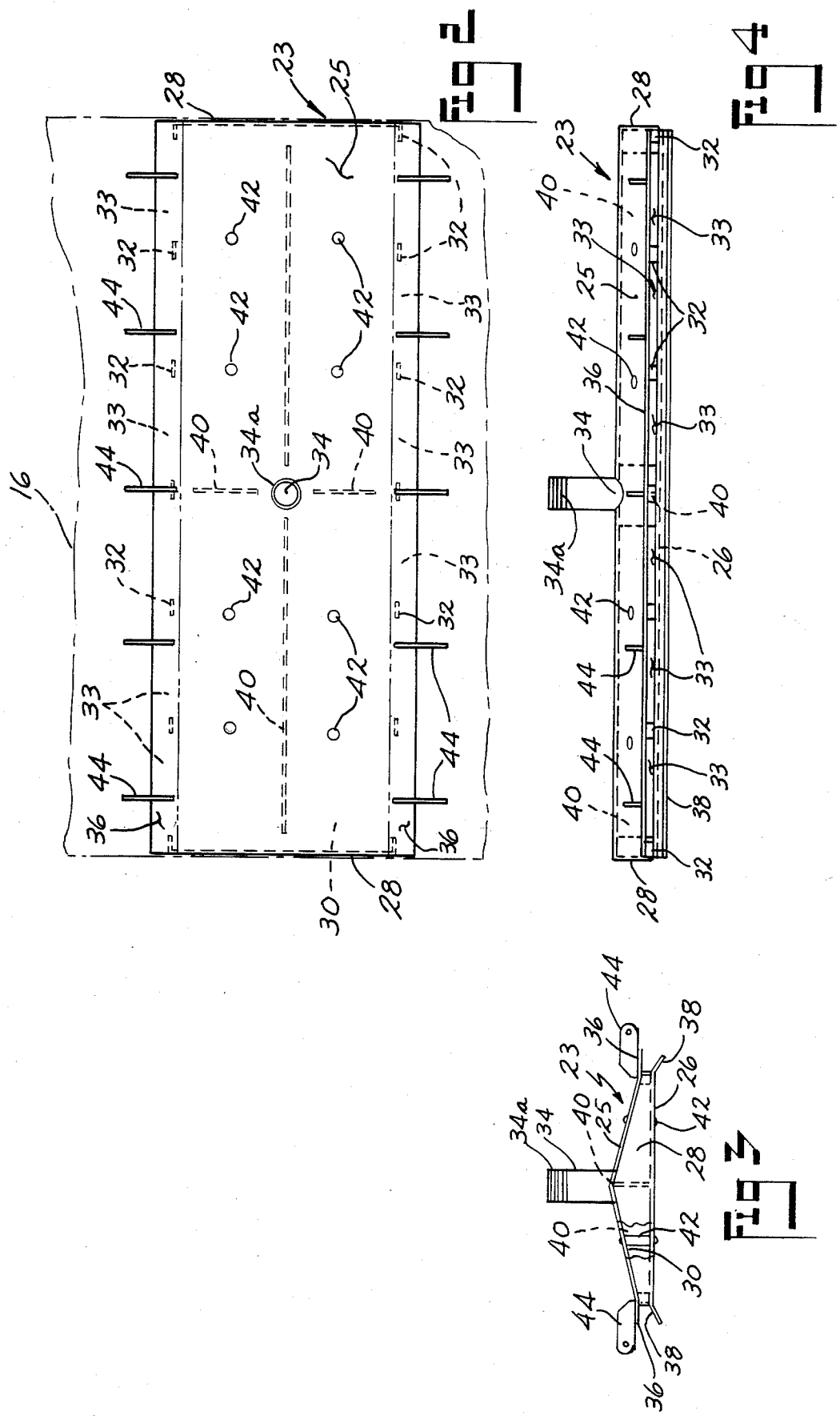

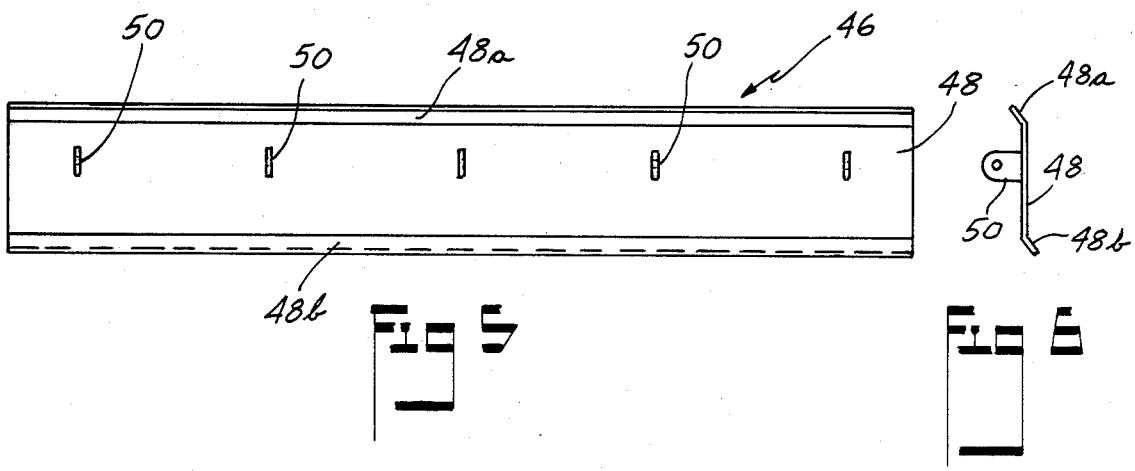
FIG. 5
FIG. 6
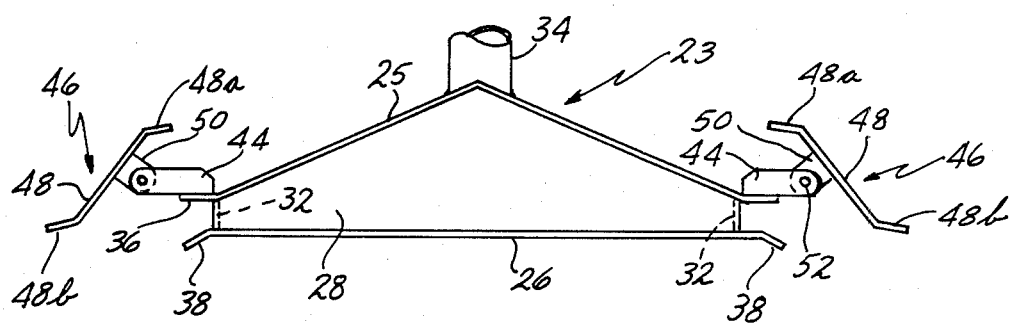
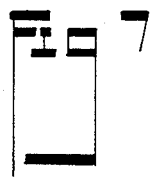
FIG. 7

HEAT SHIELD-STEAM DISTRIBUTOR FOR COOKING OVEN

In the field of large scale food preparation for the retain trade, one method of cooking food entails the use of a type of continuous oven wherein the gaseous cooking medium is a mixture of steam and air, usually at a temperature between approximately 250° F. and approximately 700° F. The actual temperature and the proportion of steam in the medium are adjusted in concert by the food processor by means of suitable controls, to obtain the desired degree of cooking, browning and moisture content of the food pieces which can include, for example, meat products, such as hamburgers, chicken, fish, etc., as well as vegetable products. Various foods require various combinations of temperature and proportion of steam in this cooking medium, and dwell time in the oven, in order to reach the desired parameters of doneness, tenderness and moistness. Because of the variations possible in both steam proportion in the cooking medium, and the temperature of the medium, this type of oven has become known in the trade as a "controlled atmosphere oven".

A further explanation of the benefits of such type oven is as follows: The normal oven as seen in household and restaurant kitchens has been in use for centuries with different methods of heating, but this "normal" oven has always been used with essentially dry heat, with little or no forced air circulation, and food therein has always been "baked" as with bread, or "roasted" as with meat. Both cooking methods result in a dry or crisp or browned outer surface of the food, usually combined with a considerable loss of weight, and a comparatively long cooking time.

In contrast, in known steam cookers, wherein food is exposed to a steam atmosphere hotter than the product, the end result is a very moist product with little weight loss, which is obtained in a shorter cooking time, but the browned outer surface of the food is missing, and so is the taste of that browning. Typical "steam cooked" flavor results, which is not always optimumly palatable. This generally non-desirable "steam cooked"0 flavor may offset the benefits obtained by fast cooking and high yield.

The "controlled atmosphere oven" can be operated to deliver most of the benefits of both the normal dry cooking oven and the steam cooker. Temperatures may be elevated to obtain a considerable degree of browning for taste and appearance, yet steam or moisture admission results in much more rapid cooking than in the dry oven, and reduced product weight loss in moisture due to the relative high vapor pressure of the steam in the cooking medium. Moderate circulation of the cooking medium by fans in such a "controlled atmosphere oven" also shortens cooking time and insures more even cooking of all sides of the food product.

In a "controlled atmosphere oven", there may be a problem in determining the points of admission for the steam. For instance, if nominal oven temperature is 400° F. and steam is admitted from a source at 20 pounds per square inch above atmospheric pressure (P.S.I.G.), the temperature of saturated steam at this pressure is only about 259° F., and only about 250° F. when it is expanded to atmospheric pressure in the oven. Thus the admitted steam can actually operate to cool the gaseous cooking medium below 400° F. at the point of steam admission. Again, if the oven is direct fired so that the flame from natural gas or a similar combustion system is fired directly into the oven, incorrect placement of steam admission may result in quenching some of the burner flame of the oven, resulting in incomplete combustion and high fuel use. In practice, the steam admitted to a "controlled atmosphere oven" must eventually be superheated to the temperature of the gaseous cooking medium and this must be accomplished either in the steam generator of the plant prior to introduction of the steam into the oven, or in the oven in a manner so as to not adversely affect oven temperature. Since there is seldom other use for superheated steam in a food processing plant, it is usually more practical to admit non-superheated plant steam into the oven and superheat it therein.

SUMMARY OF THE INVENTION

The present invention provides a novel combined heat shield and steam distributor means which is adapted for mounting in a continuous-type cooking oven utilizing a flow of gaseous cooking medium for cooking food product, such means protecting the food product on the conveyor of the oven from direct exposure to the flame from the combustion unit in the oven, while providing for optimum introduction of the steam into the gaseous cooking medium of the oven.

Accordingly, an object of the invention is to provide a steam distributor for a "controlled atmosphere oven" wherein steam may be admitted to the oven without danger of quenching any direct fire from the combustion unit of the oven.

Another objective is to provide a mechanism for admitting the steam in a way that minimizes cooling of the gaseous cooking medium.

A further objective is to provide a steam distributor for a cooking oven which is effective as both a heat shield and as a partial superheater for steam.

Other objects and advantages of the invention will be apparent from the following description taken in conjunction with the accompanying drawings:

BRIEF DESCRIPTION OF THE DRAWINGS

FIG. 2 is a detailed top plan view of the heat shield-steam distributor means as disposed above the conveyor of the oven;

FIG. 3 is a side elevational partially broken view of the FIG. 2 means;

FIG. 4 is an end elevational view of the FIG. 2 means;

FIG. 5 is a top plan view of a deflector unit adapted for use with the FIGS. 2-4 means;

FIG. 6 is a side elevational view of the deflector of FIG. 5; and

FIG. 7 is a side elevational view of the FIGS. 2-4 means with the deflector of FIGS. 5 and 6 assembled therewith in an operating position.

DESCRIPTION OF PREFERRED EMBODIMENT

Figure 1:
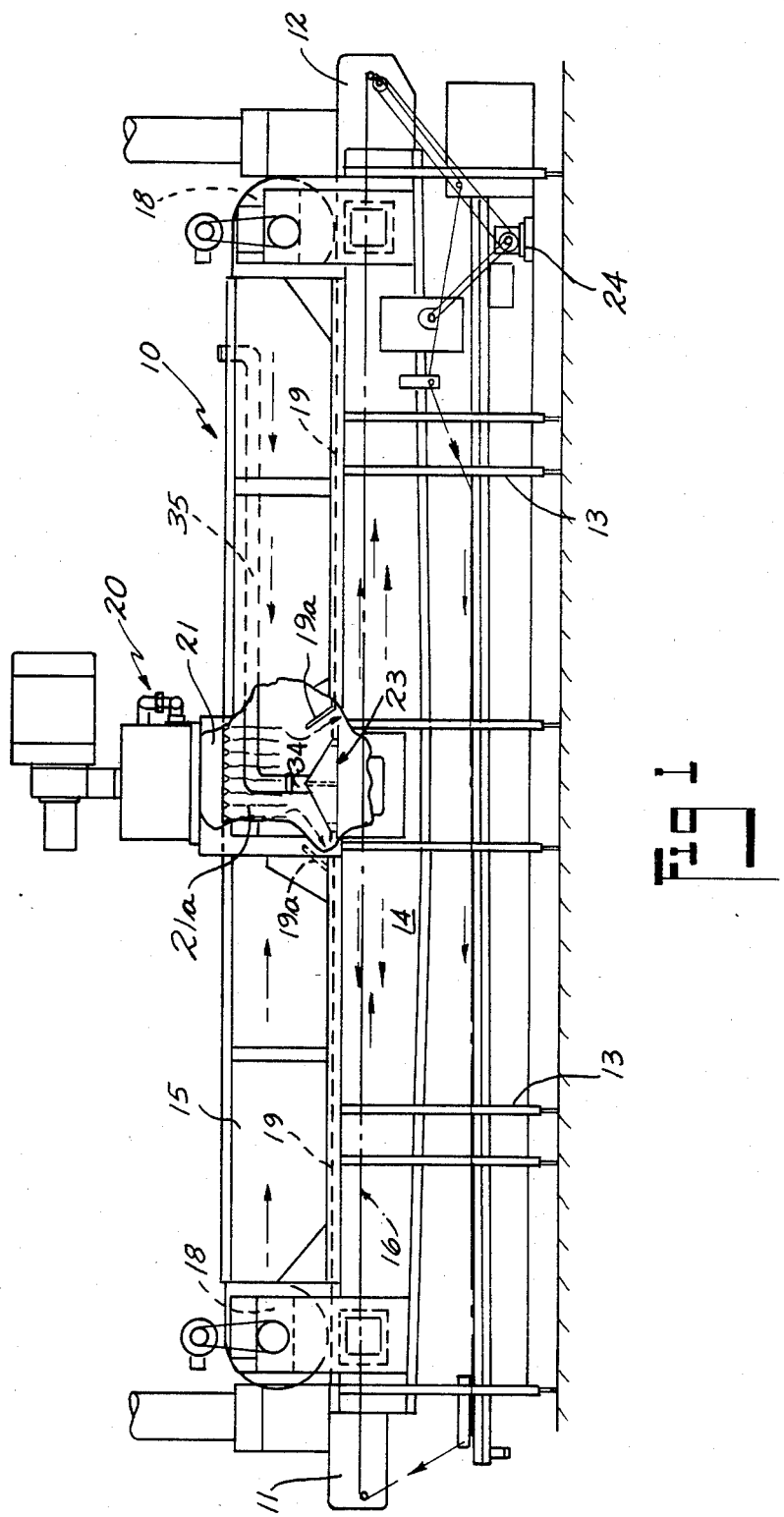
FIG. 1 is a generally diagrammatic, partially broken elevational view of one type of controlled atmosphere oven embodying the combined heat shield and steam distributor means of the invention.

Referring now to FIG. 1, the oven 10 has an infeed end 11 and a discharge end 12, a frame 13, and base portion 14 which forms the lower part of the cooking chamber, and a hood portion 15 which forms the upper part of the enclosed cooking chamber of the oven. Hood 15 may be formed in one piece or in several pieces, and is usually separable or raisable by known means from the base portion 14, for cleaning interior surfaces of the oven. A continuous food product belt conveyor 16 passes through the oven chamber in the direction shown by the full line arrows, usually returning under the base portion 14 back to the infeed end 11 of the oven. Multiple fans 18 may be provided on both ends of the oven to circulate gaseous cooking medium throughout the oven, such cooking medium in the embodiment illustrated, being partially directed by baffles 19. The actual path of the cooking medium is important to this invention only in the general area thereof in the vicinity of and under the heat source 20, where the cooking medium is heated to nominal oven temperature, and where the major portion of the steam is admitted into the oven cooking medium. In the FIG. 1 illustration the oven housing has been broken open in this area to show the oven interior.

The heat source 20, which is shown as a natural gas fired combustion system, has a burner flame producing portion 21 directed generally vertically downward toward food product pieces disposed on permeable (e.g. wire mesh) conveyor belt 16. The flame from apparatus 20 should not be allowed to touch the food product because of possible adverse effects, such as burning the food product surface.

A combined heat shield and steam distributor means 23 is provided below the combustion unit 20, so as to protect the food product on the conveyor 16 from direct exposure to flames 21a emanating from apparatus 21, and to provide for expeditious admission of steam into the gaseous cooking medium prior to circulation of the cooking medium over the food product on moving conveyor 16. Steam distributor 23 is preferably formed of stainless steel, but may be formed of other flame and heat resistant materials.

The preferred circulation of the oven cooking medium in the type of continuous flow oven illustrated, as can be best seen in FIG. 1, is accomplished by the aforementioned circulating fans 18 disposed at opposite ends of the oven 10, and which direct the gaseous cooking medium through the chamber in the oven hood portion 15, toward the generally centrally located combustion unit 20, as shown by the dot-dash arrows. The cooking medium is thus mixed with products of combustion from the heating unit 20 which heats the cooking medium to whatever operating temperature is desired or required by the food product being cooked. The gaseous cooking medium is then directed over and around the heat shield and distributor means 23, down toward the conveyor belt 16 where it moves longitudinally both above and below the pervious belt toward either the infeed end 11 or the discharge end 12 of the oven, some of the gaseous cooking medium thus flowing in the same direction as the food product on the conveyor belt and some of the cooking medium flowing in a direction opposite to the conveyor belt travel. Upon entering the fans 18, the cooking medium is again directed toward the combustion unit 20 by the fans.

The food product on the conveyor belt 16 is continuously exposed to moving gaseous cooking medium of nearly constant selected temperature, so that the food product may be evenly and expeditiously cooked and browned in a reliable manner and at the desired temperature.

Conveyor 16 is motor driven so as to cause controlled movement of the belt, with such power being furnished by any suitable power means, such as for instance a hydraulic motor unit 24. Such an oven preferably has a central control panel (not shown) which provides for automatically controlling the temperature and the steam in the oven, as well as monitoring the cooking time of the product on the conveyor belt, and can provide for automatically adjusting the amount of steam and heat being introduced into the oven in a manner known in oven control art.

The heat shield and steam distributor means 23 in the embodiment illustrated comprises a top wall or roof section 25 which in the embodiment illustrated, is of inverted generally V-shaped configuration in side elevation, as can be best seen in FIG. 3, and a generally horizontal bottom wall or floor section 26 which is connected to the top wall section 25 by side walls 28, to form an enclosure defining generally hollow interior space 30. Struts 32 may be provided extending between the top wall section 25 and the bottom wall section 26 for aiding in fixing the top wall section to the bottom wall section and rigidifying the enclosure. As can be best seen in FIG. 3, the inverted V-shaped top wall portions slope downwardly to comparatively closely spaced relationship to the bottom wall, and define in conjunction with aforementioned struts 32 elongated slots 33 in the ends of the enclosure, for emitting the steam which may be fed into the enclosure through conduit section 34 attached to and extending through the top wall section 25 generally centrally of the enclosure along the roof ridge line, as best seen in FIGS. 2, 3 and 4. Conduit 34 may be threaded at its distal end, as at 34a, for convenient attachment of steam pipe 35 (FIG. 1) coupled to a conventional source of steam in the plant where the oven may be located.

The upper or top wall portions 25 of the enclosure preferably have end flange portions 36 oriented in a generally horizontal plane, and merging smoothly with the respective adjacent obliquely sloping portion of the top wall. Also, the bottom wall section 26 may have end flange portions 38 running transversely of the enclosure in a direction transverse of the oven housing, with such flange portions 38 being directed or sloped downwardly and outwardly relative to the remainder of the bottom wall and to the respective overlying flange portion 36. As can be seen from FIG. 3, such flange portions 36, 38 extend laterally of the side walls 28 of the enclosure.

Interior braces 40 and rods 42 attached to and extending between the top and bottom walls of the enclosure, aid in rigidifying the enclosure. The interior space of the enclosure beneath the steam entrance 34 is preferably unobstructed as shown in FIGS. 2, 3 and 4.

Steam is supplied to the pipe 35 where it enters the enclosure via conduit section 34, and into the space 30 defined by the enclosure. The steam fills space 30 and flows outwardly toward the ends of the enclosure where it passes through the converging throats defined by the top and bottom wall sections of the enclosure, and then passes out through the apertures or slots 33, to be intermixed with the gaseous cooking medium circulated by the end fans 18 of the cooking oven and flowing past the exterior of enclosure 23. It will be seen that the steam supplied to the enclosure and emanating from the slots 33, is maintained separated from the flame producing mechanism 21 of the combustion unit, and therefore will not quench any of the flame produced by the combustion unit 20. Moreover, the steam is dispersed from both ends of the heat shield-steam distributor means 23, and is expeditiously mixed with the gaseous cooking medium being circulated through the oven, to replenish any of the steam that is lost at the inlet and the outlet ends of the oven or is condensed on cool product while cooking said product, and thus maintains the preselected amount of steam in the cooking medium in the oven. It is generally preferable that in an oven of the type illustrated, that the aforementioned slots 33 be approximately ⅜ of an inch in height, with the other dimensions of the heat shield-steam distributor means 23 being accommodated to the particular size of oven in which it is installed.

It will be noted that the means 23 is adapted to effectively shield the products on the conveyor belt 16 from direct exposure to the flame 21a emanating from combustion mechanism 20 and that the top wall 25 of the means 23 is continuously exposed to flame, which could tend to promote warping of such top wall 25 even with the structural rigidifying thereof as described. However, the underside of the top wall 25 is being continuously swept by steam supplied from the source, as the steam travels into the enclosure and then out of the slots 33. As aforementioned, the steam, when admitted into the oven is usually cooler than the required oven temperature, and may be considerably cooler than the temperature of the flames coming from combustion unit 20 by a matter of a thousand degrees Fahrenheit or more. This flow of steam into steam distributor 23 continuously cools the underside of the top wall portion 25 while such steam is being heated closer to the desired oven temperature, by radiation and conduction from top wall 25. Thus the heat shield and steam distributor means 23 is protected from overheating by being continuously cooled by steam as the steam is being superheated. This superheated steam is then discharged from the steam distributor 23 via slots 33 at a temperature above the normal steam admission temperature to said distributor 23, and thus operates to reduce potential cooling of the cooking medium. The steam is preferably admitted by means 23 across substantially the entire width of the conveyor and the cooking chamber of the oven in the direction of normal cooking medium flow, so that it intermixes well with the moving gaseous cooking medium streaming past said steam distributor 23.

While flanges have been shown on the endwise edges of the top wall and the bottom wall of the heat shield-steam distributor means, it will be understood that such flanges are not critical to the operation of said distributor 23 and may be eliminated in the interests of economy, but they do serve to generally stiffen the edges of the roof or top wall and the floor or bottom wall and are preferred. Steam distributor 23 may be effectively formed of steel plate to aid in resisting warpage due to exposure to the flames from combustion unit 20. Such plate material may be, for instance, 11 gauge steel plate, preferably stainless steel plate.

Referring now to FIGS. 5, 6 and 7 in conjunction with FIGS. 2, 3 and 4, the steam distributor 23 may be provided with spaced brackets 44 secured to the top wall 25 in order to mount the deflector mechanism 46 of FIGS. 5 and 6 thereon, as shown generally diagrammatically in FIG. 7.

Deflector mechanism 46 comprises a generally flat plate 48 which may be stiffened by bending the edges thereof into flange portions 48a and 48b, with such flange portions being preferably disposed at least 15° out of the plane of the major portion of the plate 48. Tabs 50 are added to one side of the plate and fastened thereto as by welds, so that they may be mounted on and work in conjunction with the pierced brackets 44 on the top wall of the steam distributor 23. Fasteners 52 coacting between the tabs and the brackets may be utilized to secure the deflector plate to the steam distributor 23 on both ends thereof and tightened, to hold the deflector at any angle desired, for instance as illustrated in FIG. 7. Deflector 46 serves to aid in directing the gaseous cooking medium toward the product pieces on the conveyor and through the interstices between them. Sometimes such direction of the cooking medium is beneficial for some types of products, but may be totally unnecessary for other products. By utilizing removable fasteners 52 with the deflector, the deflector may be mounted or removed as desired, depending on the type of food product being cooked in the oven. Such a deflector arrangement ensures the downwardly directed entry of the steam from the steam distributor 23 into the cooking medium flowing past the baffle plates 19, and between the upwardly turned ends 19a thereof and the opposed downwardly sloping exterior surfaces of the top wall portion 25 of said steam distributor.

From the foregoing discussion and accompanying drawings, it will be seen that the invention provides a novel combined heat shield and steam distributor means 23 for a cooking oven which is adapted to be located in the oven between a flame producing combustion unit and a movable food product conveyor, to protect the food product on the conveyor from direct exposure to flame from the combustion unit, and with such shielding and distributor means also providing for the introduction and distribution of steam into the cooking chamber for intermixing with the gaseous cooking medium of the oven.

The invention also provides a novel heat shield-steam distributor means wherein the introduced steam is utilized to maintain the surfaces of the heat shield-steam distributor means that are exposed to the direct flame of the combustion unit of the oven, cooled in a manner to aid in preventing warping thereof, while providing for heating the steam introduced into the distributor means toward a superheated condition, so that the introduced steam does not adversely affect the temperature of the cooking medium of the oven, and by being located directly under the flame producing combustion unit, the heat shield distributor means shields the food product from direct exposure to possible detrimental burning by the flame.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. Heat shield-steam distributor means for use in an oven for cooking food product, said oven having an enclosed elongated food cooking chamber through which food product is moved along a conveyance path and wherein a cooking medium comprising a mixture of hot air and steam in controllable proportions is brought into contact with the food product as it is moved along the conveyance path and wherein the primary heat source for heating the cooking medium is a combustion unit adapted to direct flame into the cooking medium in the cooking chamber of said oven and toward the moving product, said heat shield-steam distributor means being located between said combustion unit and said food product and effective to protect said product from direct exposure to the flame of said combustion unit, and said heat shield-steam distributor means also embodying means for distributing steam into said cooking chamber.

2. Heat shield-steam distributor means as defined in claim 1 and which comprises an enclosure having top and bottom walls and means connecting said top and bottom walls in spaced relation to each other, said enclosure having apertures therein through which the steam may be emitted from said enclosure, and wherein said distributor means is disposed between the food product and the combustion unit effective to direct the flame from said combustion unit toward the top wall of said enclosure.

3. Heat shield-steam distributing means as defined in claim 2 and wherein said enclosure is primarily constructed of heat absorbing material and has a roof plate and a base plate held in spaced relationship to each other, slot means bordered on the top by said roof plate and on the bottom by said base plate, said roof plate being attached to a steam supply means for furnishing steam to said oven whereby said steam may enter said steam distributing means and leave said steam distributing means through said slots to enter said cooking chamber and said roof plate being directly exposed to said flame and heated thereby, said steam in transiting said steam distributing means absorbing heat from said roof plate and thereby becoming more superheated while thus effecting cooling of said steam distributing means.

4. Heat shield-steam distributing means as defined in claim 3 and wherein said slot means extend in a direction generally transverse of the conveyance path for distributing steam into said cooking chamber above the food product.

5. Heat shield-steam distributor means as defined in claim 3 and wherein deflector means on said enclosure coact with said enclosure to vary the path of entry of the steam from said enclosure into said cooking chamber.

6. Heat shield-steam distributor means as defined in claim 5 wherein the deflector means is generally S-shaped in side elevation and extends generally transverse of said oven adjacent said apertures in said enclosure being effective to direct steam into the cooking chamber.

7. Heat shield-steam distributor means in accordance with claim 6 and wherein the deflector means is adjustable for selectively regulating the rate of flow of steam into the cooking chamber.

8. Heat shield-steam distributor means as defined in claim 3 and wherein the enclosure has imperforate side walls connecting said top and bottom walls and defining an interior enclosure space and wherein the apertures comprise spaced slots extending transverse of said enclosure intermediate said top and bottom walls.

* * * * *